(12) United States Patent
Medeiros et al.

(10) Patent No.: US 12,440,956 B2
(45) Date of Patent: Oct. 14, 2025

(54) POWER TOOL WAKE UP (71) Applicant: MILWAUKEE ELECTRIC TOOL CORPORATION, Brookfield, WI (US)

(72) Inventors: Daniel W. Medeiros, Brookfield, WI (US); Vivek Anand, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/842,236

(22) PCT Filed: Feb. 28, 2023

(86) PCT No.: PCT/US2023/014085
§ 371 (c)(1),
(2) Date: Aug. 28, 2024

(87) PCT Pub. No.: WO2023/164278
PCT Pub. Date: Aug. 31, 2023

(65) Prior Publication Data
US 2025/0178177 A1 Jun. 5, 2025

Related U.S. Application Data (60) Provisional application No. 63/314,732, filed on Feb. 28, 2022.

(51) Int. Cl.
*B25F 5/02* (2006.01)
*H02P 1/46* (2006.01)
(52) U.S. Cl.
CPC . *B25F 5/02* (2013.01); *H02P 1/46* (2013.01)

(58) Field of Classification Search
CPC .................................. B25F 5/02; H02P 1/46
See application file for complete search history.

(56) References Cited

U.S. PATENT DOCUMENTS

| | | | |
|---|---|---|---|
| 2019/0121415 A1 | 4/2019 | Tong et al. | |
| 2021/0121967 A1* | 4/2021 | Vetter | B23B 45/003 |
| 2021/0252652 A1 | 8/2021 | Mueckl et al. | |
| 2023/0284374 A1* | 9/2023 | Lienau | H01Q 1/48 |
| | | | 173/217 |

FOREIGN PATENT DOCUMENTS

| | | |
|---|---|---|
| CN | 101224571 A | 7/2008 |
| EP | 2656485 B1 | 5/2015 |
| WO | 2021183422 A1 | 9/2021 |

OTHER PUBLICATIONS

International Search Report and Written Opinion for Application No. PCT/US2023/014085 dated Jun. 22, 2023 (11 pages).

* cited by examiner

*Primary Examiner* — Michelle Lopez
(74) *Attorney, Agent, or Firm* — Michael Best & Friedrich LLP (57) ABSTRACT

A power tool including a housing, and a motor drive circuit coupled to a motor. The power tool further includes a motor controller coupled to the motor drive circuit. The motor control circuit is configured to detect an input received from a sensor and determine whether the detected input exceeds a predetermined value. The motor control circuit is also configured to determine whether the power tool is in a sleep condition and initiate the wake-up operation in response determining that the detected input exceeds the predetermined value and determining that the power tool is in the sleep condition.

20 Claims, 7 Drawing Sheets

POWER TOOL WAKE UP

CROSS-REFERENCE TO RELATED APPLICATIONS

This application is a National Stage filing under 35 U.S.C. § 371 of International Application No. PCT/US2023/014085, filed on Feb. 28, 2023, which claims priority to, and the benefit of, U.S. Provisional Patent Application No. 63/314,732, filed Feb. 28, 2022, the entire content of which is hereby incorporated by reference.

FIELD

Embodiments described herein relate to waking up a power tool from a sleep or standby state based on detected motion of the power tool.

SUMMARY

Battery pack powered power tools may enter a sleep or standby mode when not used for a period of time in an effort to increase battery life. Generally, current power tools are woken from or exit the sleep/standby mode when an affirmative action is taken by a user, such as depressing a trigger. However, this may result in a delay between the user depressing the trigger and the motor beginning operation due to the time required to exit the sleep/standby state.

Embodiments described herein provide reduction of the "inactive time" from trigger activation to activation of the power tool.

Power tools described herein include a housing, a sensor, a motor drive circuit coupled to a motor, and a motor controller coupled to the motor drive circuit. The motor controller is configured to detect an input received from the sensor indicating that a wake-up operation is required, and determine whether the detected input exceeds a predetermined value. The motor controller is also configured to determine whether the power tool is in a sleep condition and initiate the wake-up operation in response to determining that the detected input exceeds the predetermined value and determining that the power tool is in the sleep condition.

In one aspect, the motor controller is further configured to start a timer upon initiating the wake-up operation, determine whether an interrupt signal is received at the motor controller, and determine that the timer has expired. The motor controller is also configured to resume operating in the sleep condition in response to the timer expiring and no interrupt signal being received.

In another aspect, the interrupt signal is an actuation of a trigger of the power tool.

In another aspect, the sensor is at least one selected from a group consisting of an accelerometer, a piezoelectric sensor, and a capacitive wake-up sensor.

In another aspect, the wake-up operation prepares the motor to operate immediately upon receiving an input from a trigger of the power tool.

In another aspect, the sensor is a pressure sensor configured to detect a user gripping the power tool.

In another aspect, the sensor is an ultrasonic sensor configured to detect the presence of a user's hand on the power tool.

Processes described herein include a method for initiating a wake-up operation in a power tool. The method includes detecting an input received from a sensor of the power tool indicating that a wake-up operation is required. The method also includes determining whether the power tool is in a sleep condition and initiating the wake-up operation in response to determining that the input received from the sensor exceeds a predetermined value, and determining that the power tool is in the sleep condition.

In one aspect, the interrupt signal is generated by a user input received at a user interface of the power tool.

In another aspect, the wake-up operation initializes a motor of the power tool to operate immediately upon receiving an input from the trigger.

In another aspect, the sensor is at least one selected from a group consisting of a capacitive sensor, a piezoelectric sensor, and an accelerometer.

In another aspect, the sensor is a pressure sensor configured to detect a user gripping the power tool.

In another aspect, the sensor is an ultrasonic sensor configured to detect the presence of a user's hand on the power tool.

Power tools described herein include a sensor and a motor drive circuit connected to a motor and configured to drive the motor in response to a drive signal received from the user interface. A motor controller is connected to the motor drive circuit and configured to receive an input from the sensor, determine whether the input received from the sensor exceeds a predetermined value, determine whether the power tool is in the sleep condition, and initiate a wake-up operation in response to determining that the input received from the sensor exceeds the predetermined value and that the power tool is in the sleep condition. The motor controller is further configured to start a timer upon initiating the wake-up operation, determine whether an interrupt signal is received, determine that the timer has expired, and resume the sleep condition in response to the timer expiring and no interrupt signal being received.

In one aspect, the motor controller is further configured to start a timer upon initiating the wake-up operation, determine whether an interrupt signal is received, determine that the timer has expired, and resume the sleep condition in response to the timer expiring and no interrupt signal being received.

In another aspect, the interrupt is a user input received from the user interface.

In another aspect, the sensor is a piezoelectric sensor.

In another aspect, the sensor is a capacitive sensor.

In another aspect, the sensor is a mechanical accelerometer.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
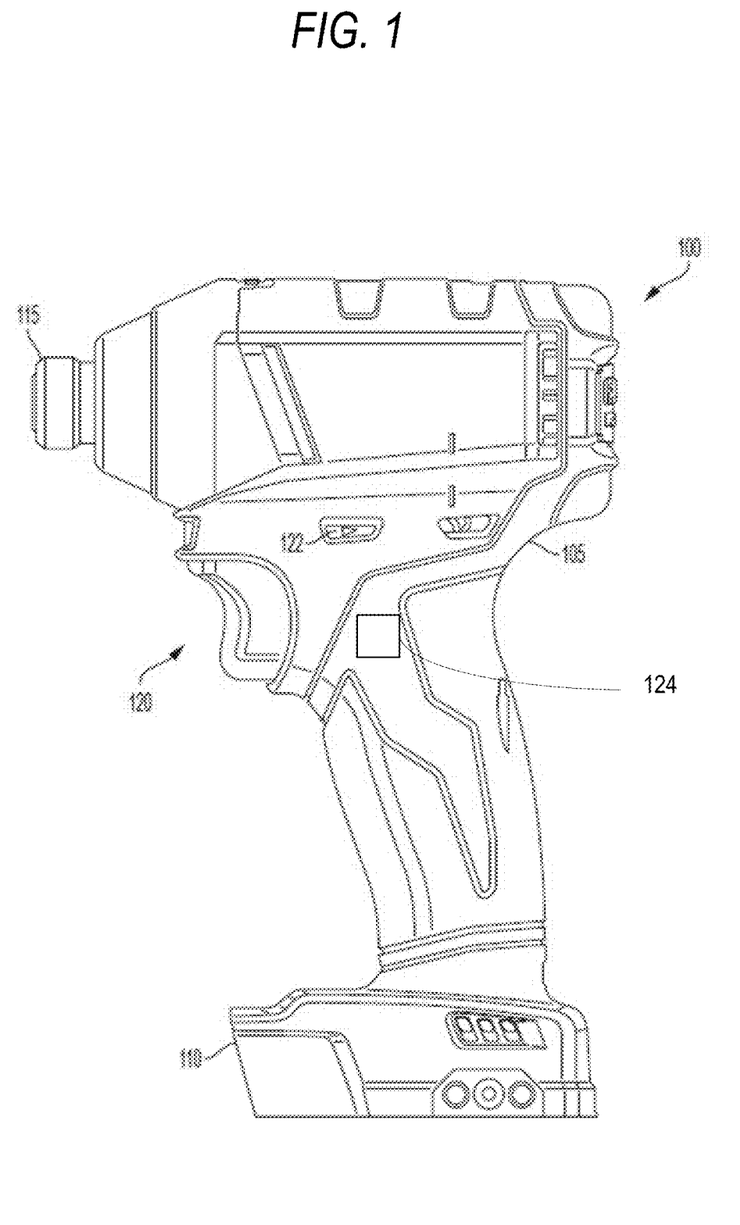
FIG. 1 is a perspective view of a power tool including a trigger, according to some embodiments.

FIG. 1 illustrates an example power tool 100, according to some embodiments. The power tool 100 includes a housing 105, a battery pack interface 110, a driver 115 (e.g., a chuck or bit holder), and an input, such as a trigger assembly 120. The power tool 100 may further have a forward-reverse selector 122, which can allow a user to control the direction of a rotating portion of the tool. The power tool 100 may furthermore have a mode selector input or other user interface elements, such as a clutch ring, a gear selector, a speed selector, and the like. In other embodiments, the power tool 100 may further include various sensors 124, such as motion sensors (e.g., gyroscope and/or accelerometer) to provide information to a controller of the power tool 100 (described below) related to an orientation (e.g., up, horizontal, down, etc.) or movement of the power tool 100. The movement information may be used by the controller to determine that the tool is in motion and initiate a wake-up operation, as described in more detail below.

While FIG. 1 shows a specific power tool with a rotational output, it is contemplated that the herein described wake-up operations may be used with multiple types of power tools, such as drills, drivers, impact drivers, impulse drivers, saws (e.g., band saws, circular saws, miter saws, and the like), lights, hammer drills, nail guns, staple guns, liquid dispenser (e.g., caulk guns), crimping and/or clamping devices, and/or another type of power tool that uses a brushless DC motor that is controlled via a user input (e.g., a trigger).

Figure 2:
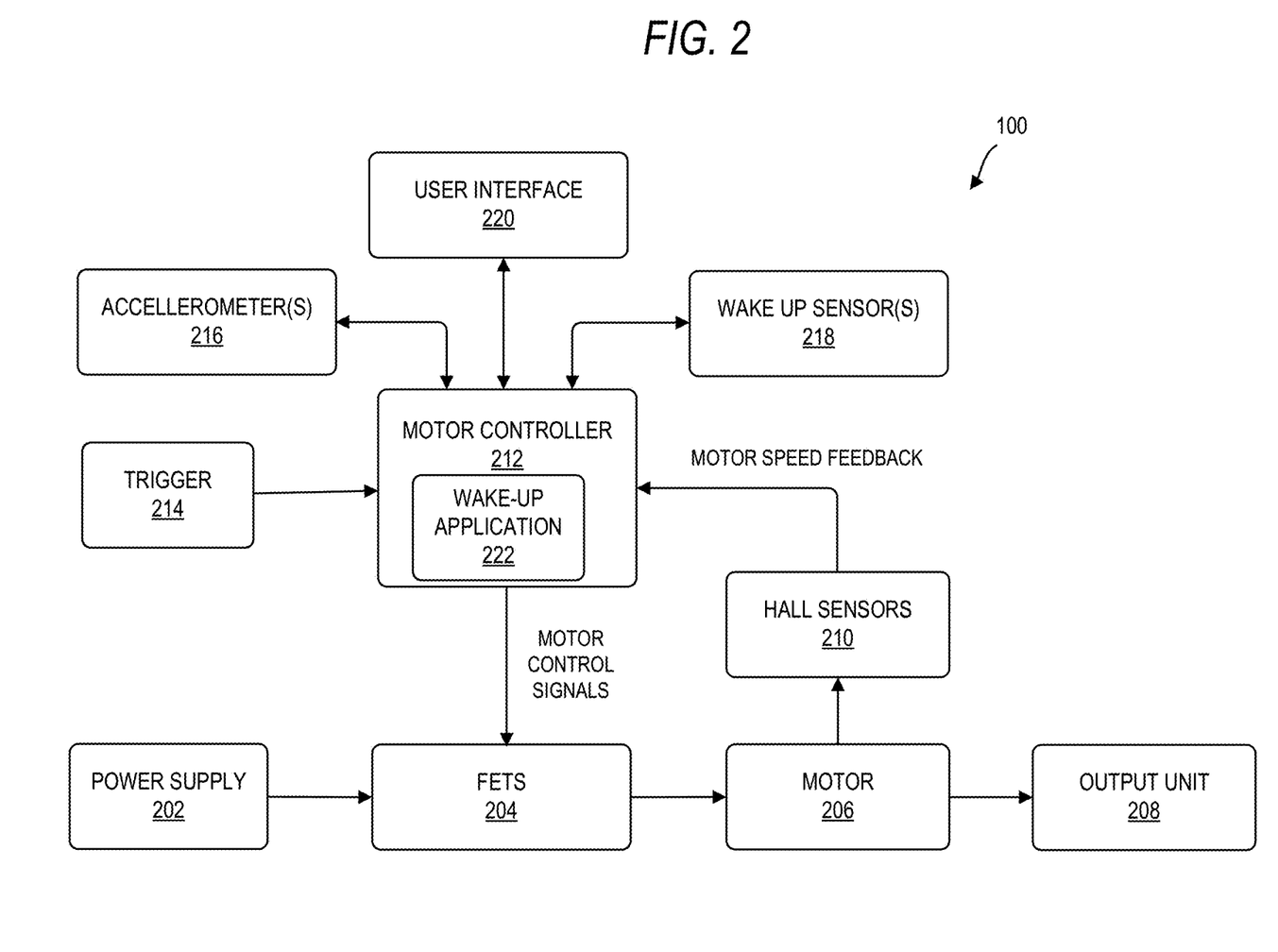
FIG. 2 is a block diagram of a power tool control system, according to some embodiments.

FIG. 2 is a block diagram of the example power tool 100 of FIG. 1. The power tool 100 includes a power supply 202, a motor drive circuit 204, such as field effect transistors (FETs), a motor 206, an output unit 208 (e.g., driver 115), Hall effect sensors 210, a motor controller 212, a trigger 214 such as trigger assembly 120, one or more accelerometers 216, one or more wake-up sensors 218, and a user interface 220. While described herein as a trigger 214, other input types such as push buttons, sliders, pressure sensors, and the like are also contemplated as appropriate for a given application. The Hall effect sensors 210 provide motor information feedback to the motor controller 212, such as motor rotational position information, which can be used by the motor controller 212 to determine position, velocity, and/or acceleration of the motor 206. In some embodiments, other sensing techniques, such as back-emf sensing may allow for determination of motor rotation speed without the need for the Hall effect sensors 210.

The one or more accelerometers 216 are configured to detect motion of the tool 100 and provide data to the controller 212 indicating that the tool 100 is in motion. In some examples, the accelerometers 216 may generate an output to the controller 212 when a detected motion exceeds a predetermined value, thereby indicating that the tool 100 is in motion. In other embodiments, data is provided to the controller 212 by the accelerometers 216 when any motion is detected. The controller 212 may then determine that the tool 100 is in motion and that a wake-up operation is required. The one or more wake-up sensors 218 are configured to provide other indications to the motor controller 212 that the tool 100 is being manipulated (e.g., gripped, handled, etc.) by a user. Various sensors, such as, photoelectric sensors, pressure sensors, and the like may be used as the wake-up sensors 218, as will be described in more detail below.

The motor controller 212 includes an electronic processor and a memory storing instructions that, when executed by the electronic processor, cause the motor controller 212 to carry out the functionality of the controller described herein. For example, the memory of the motor controller 212 may include a wake-up application 222, which may include instructions configured to perform the various wake-up functions described herein. The motor controller 212 is configured to receive input from wake-up sensors 218 indicating that the power tool 100 should wake-up. The motor controller 212 is also configured to receive inputs from the user interface 220, such as trigger mapping profiles, and the like.

The user interface 220 may be configured to receive an input from, or provide feedback to, one or more users. For example, the user interface 220 may be a display configured to provide information to the user regarding the status or operational mode of the power tool 100. For example, the user interface 220 may be a series of LEDs or other indicators, a touchscreen, a display screen, or other visual device.

In some embodiments, the motor 206 is controlled electronically rather than using a gear box or mechanical controls. In response to the motor information feedback from the Hall effect sensors 210 and user control input from the trigger 214, the motor controller 212 transmits control signals to accurately control the motor drive circuit 204 to drive the motor 206. By selectively enabling and disabling the motor drive circuit 204, power received from the power supply 202 is selectively applied to the motor 206 to cause rotation of a rotor of the motor 206. The rotating rotor of the motor 206 drives the output unit 208. In some embodiments, the motor speed indicated by the output of the Hall effect sensors 210 enables the motor controller 212 to implement closed loop speed control. The closed loop speed control enables the motor controller 212 to adjust motor power to maintain an RPM selected by the trigger 214, as a load on the motor 206 varies during an operation. For example, using the closed loop speed control, the motor controller 212 may increase motor power to maintain a selected maximum RPM when a load is increased. The control signals sent by the motor controller 212 to the motor drive circuit 204 may comprise pulse width modulation (PWM) signals that drive the speed of the motor 206 based on a duty cycle of the PWM signals.

The motor controller 212 and other components of power tool 100 are electrically coupled to and receive power from the power supply 202. In some embodiments, the power supply 202 includes one or more lithium-ion battery packs. In one example, the power supply 202 includes an 18V lithium-ion battery pack. However, lithium-ion battery packs of more than 18V or less than 18V are also contemplated. In other embodiments, the power supply 202 may be another energy storage device, such as alkaline batteries, lead acid batteries, nickel metal hydride batteries, etc. In still further embodiments, the power supply 202 may be an AC power source, such as provided by a utility.

Figure 3:
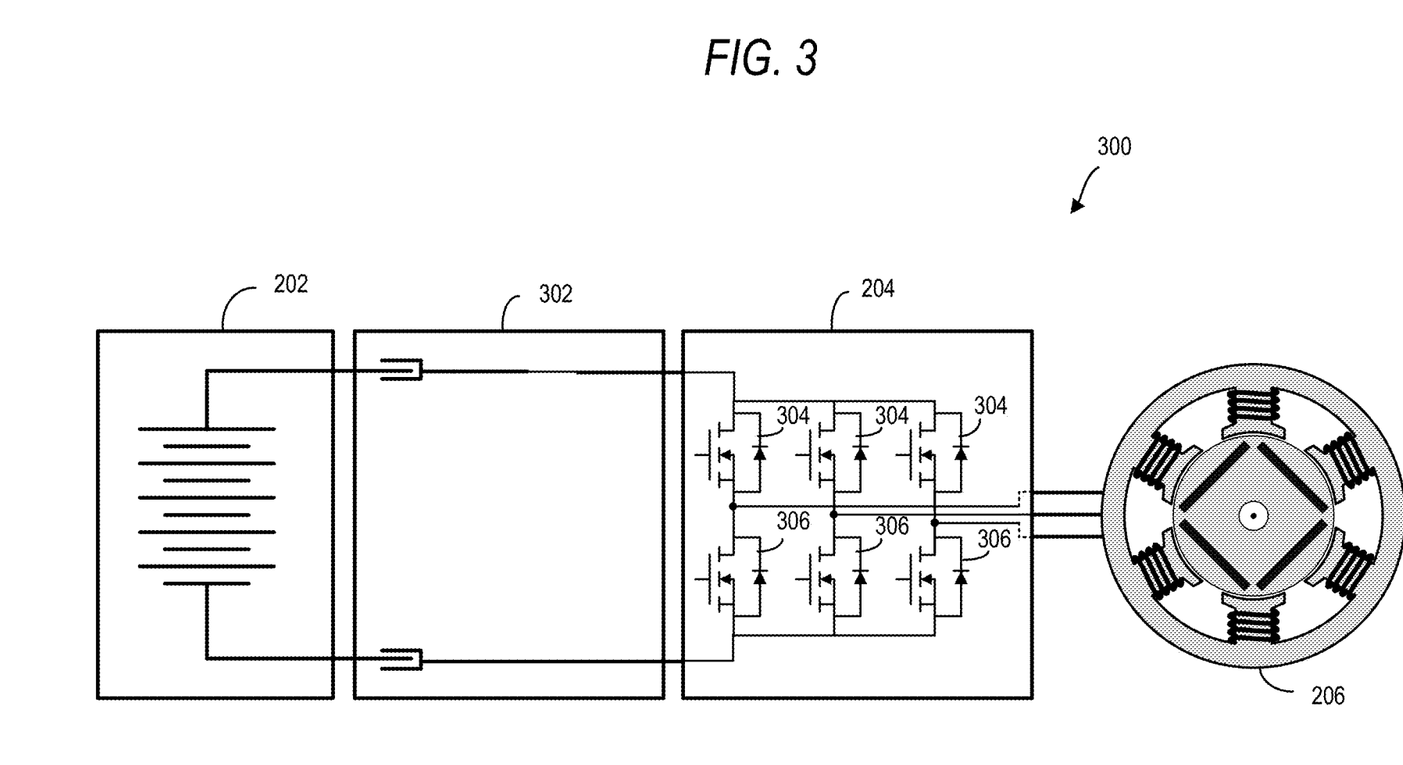
FIG. 3 is a circuit diagram of a power switching network, according to some embodiments.

FIG. 3 illustrates a circuit diagram of a motor driving circuit 300. The motor driving circuit 300 is described with respect to the power tool 100, and includes the power supply 202, the motor drive circuit 204 and the motor 206. The power supply 202 is coupled to the power tool 100 via a power connection 302. In one embodiment, the power connection 302 is the battery pack interface 110 described above. The motor drive circuit 204 includes, for example, a number of high side power switching elements 304 (e.g., field effect transistors [FETs]) and a number of low side power switching elements 306 (e.g., FETs). The motor controller 212 provides the control signals to control the high side power switching elements 304 and the low side power switching elements 306 to drive the motor 206 based on the motor feedback information and user controls described above. For example, in response to detecting a pull of the trigger 214, the motor controller 212 provides the control signals to selectively enable and disable the power switching elements 304 and 306 (e.g., sequentially, in pairs) resulting in power from the power supply 202 to be selectively applied to stator coils of the motor 206 to cause rotation of a rotor. More particularly, to drive the motor 206, the motor controller 212 enables a first high side power switching element 304 and first low side power switching element 306 pair (e.g., by providing a voltage at a gate terminal of the power switching elements) for a first period of time. In response to determining that the rotor of the motor 206 has rotated based on a pulse from the Hall effect sensors 210, the motor controller 212 disables the first power switching element pair and enables a second high side power switching element 304 and a second low side power switching element 306. In response to determining that the rotor of the motor 206 has rotated based on pulse(s) from the Hall effect sensors 210, the motor controller 212 disables the second power switching element pair and enables a third high side power switching element 304 and a third low side power switching element 306. This sequence of cyclically enabling pairs of high side power switching elements 304 and low side power switching elements 306 repeats to drive the motor 206. Further, in some embodiments, the control signals include pulse width modulated (PWM) signals having a duty cycle that is set according to the amount of trigger pull of the trigger 214 (as indicated by the output of the trigger 214), to thereby control the speed or torque of the motor 206.

Generally, battery pack powered power tools, such as power tool 100, may enter a stand-by or sleep mode when not used for a period of time to reduce power consumption. Existing power tools may rely on an active user interaction (e.g., trigger press, manual actuation of an input, etc.) to exit the stand-by or sleep mode and "wake-up." This requirement of an affirmative action by the user can cause delays or require the user to first remember to perform the required operation. The concepts described herein allow for the power tool to recognize a general user interaction (e.g., the user handling and/or moving the power tool) and automatically waking-up the tool to allow for the user to proceed to using the tool without having to first turn the tool ON or perform some other type of affirmative action to exit the sleep mode. As described in more detail below, the controller 212 may initiate a wake-up operation based on receiving an input or other data from the one or more accelerometers 216 and/or other wake-up sensors 218. In some embodiments, when an acceleration above an acceleration threshold is detected using an accelerometer, the power tool 100 enters the wake-up mode. In other embodiments, the accelerometer 216 will output the signal to the controller 212 when the detected acceleration is sufficient to require a wake-up operation.

Figure 4A:
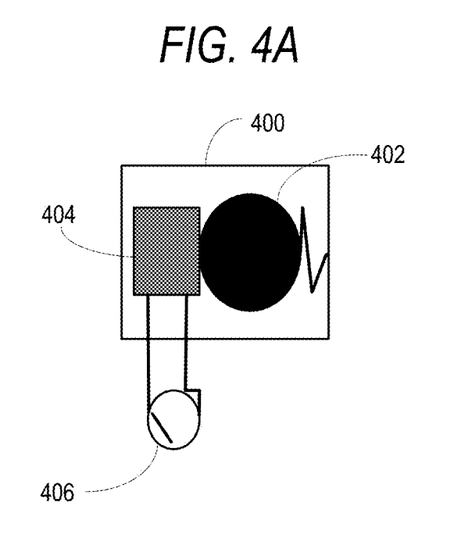
FIGS. 4A-4B are circuit diagrams illustrating a piezoelectric wake-up sensor, according to some embodiments.
Figure 4B:
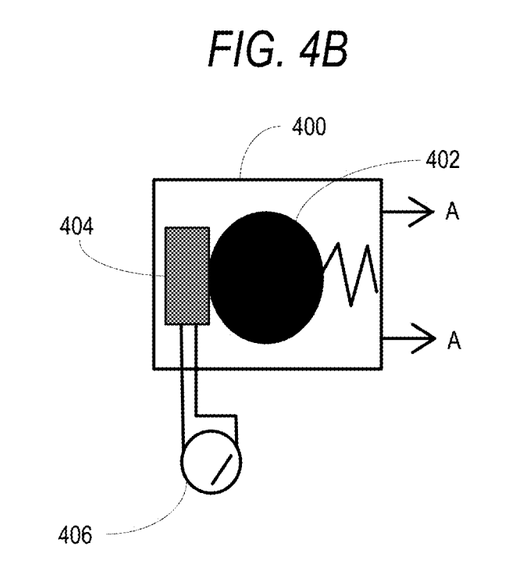

Turning now to FIGS. 4A-4B, a piezoelectric sensor 400 (e.g., a piezoelectric motion sensor, a piezoelectric accelerometer, etc.) is shown, according to one embodiment. In one embodiment, the piezoelectric sensor 400 is used to determine when a wake-up operation is required, as described in more detail below. Further, while described as a single piezoelectric sensor, certain implementations of the power tool 100 may include more than one piezoelectric sensor 400. The piezoelectric sensor 400 includes a spring-biased mass 402 and a crystal 404. The spring-biased mass 402 is in contact with the crystal 404. When generally at rest (e.g., when the power tool 100 is not in motion), the force the mass 402 applies to the crystal 404 is constant and minimal. In one embodiment, the crystal 404 is a piezoelectric crystal, such that when pressure is applied to the crystal by the mass 402, a voltage is generated at the output 406. The mass 402 is configured such that movement of the associated power tool 100, such as in direction A, causes the mass to press against crystal 404 as shown in FIG. 4B, thereby generating an output voltage due to the pressure applied to the crystal 404. In some embodiments, the output 406 is provided to the controller 212. The controller 212 may be configured to determine whether the voltage exceeds a predetermined value indicating that the power tool 100 has been moved, indicating that a user is intending to use the power tool 100. In other embodiments, the piezoelectric sensor 400 may include circuitry to only output a signal to the controller 212 when the magnitude of the signal (i.e., the amount of movement of the power tool 100) exceeds a predetermined value or threshold for initiating a wake-up operation. As will be described in more detail below, the controller 212 may initiate a wake-up operation based on the output of the piezoelectric sensor 400. In some examples, the power tool 100 may include multiple piezoelectric sensors 400 to allow for movement in various directions to be detected and provided as an input to the controller 212.

Figure 5A:
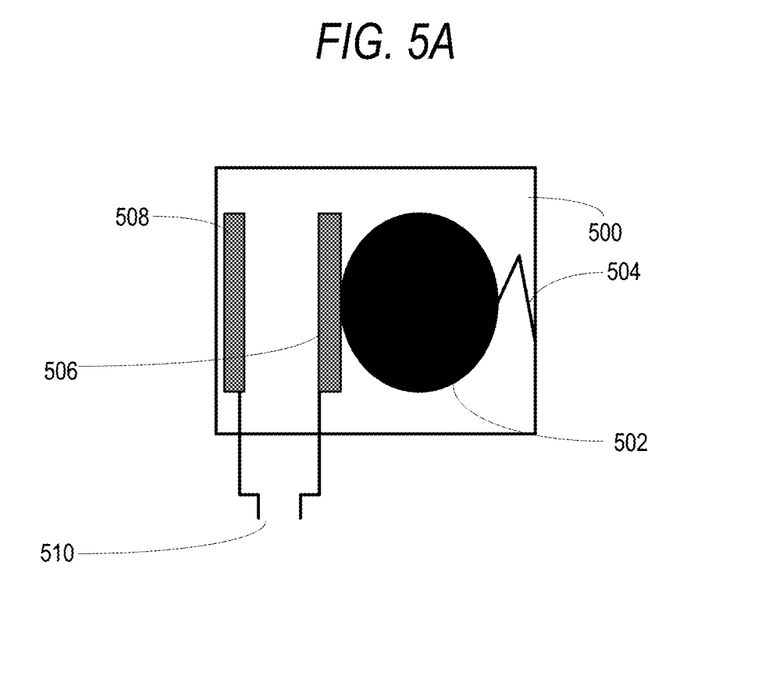
FIGS. 5A-5B are circuit diagrams illustrating a capacitive wake-up sensor, according to some embodiments.
Figure 5B:
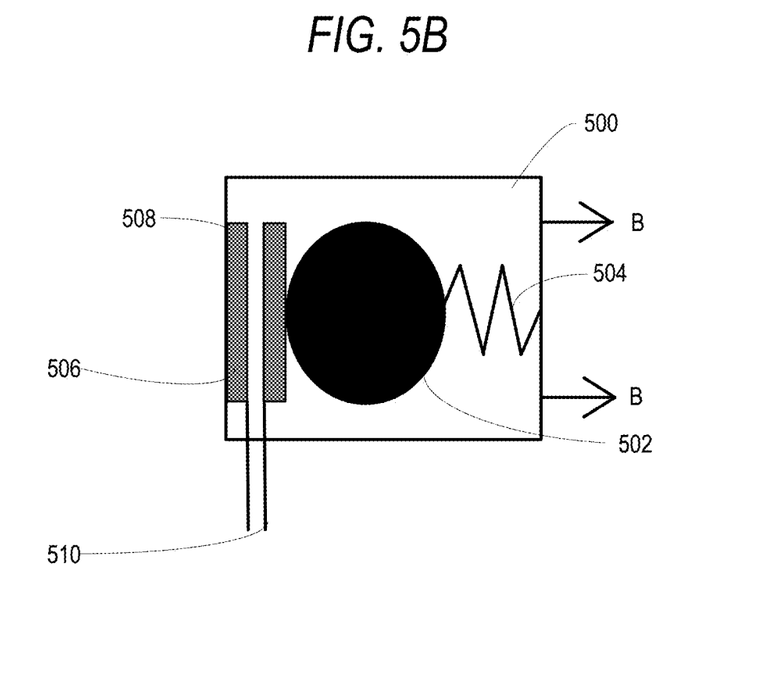

Turning now to FIGS. 5A-5B, a capacitive sensor 500 (e.g., a capacitive motion sensor, a capacitive accelerometer, etc.) is shown, according to some embodiments. In some embodiments, the capacitive sensor 500 is used to determine when a wake-up operation is required, as described in more detail below. The capacitive sensor 500 may include a spring-biased mass 502, wherein a spring 504 is oriented in a plane parallel to the desired direction of motion of the power tool 100. Thus, in some examples, multiple capacitive sensors 500 may be used to detect motion on one or more of an x-axis, a y-axis, and a z-axis of the power tool 100. The mass 502 may further be connected to a conductive plate 506. The capacitive sensor 500 is configured such that as the power tool 100 moves in a direction B parallel to the spring 504, the mass 502 pushes the plate 506 closer to a corresponding plate 508 that is in a fixed position, as shown in FIG. 5B. The plates 506 and 508 form a parallel-plate capacitor, such that as the positions of the plates 506, 508 move in relation to each other, a capacitance at the output 510 is varied. This capacitance (or a subsequent current or voltage generated from the varied capacitance) may be provided to the controller 212. As described above, the controller 212 may be configured to determine whether the change in capacitance exceeds a predetermined value indicating that the power tool 100 has been moved, indicating that a user is intending to use the power tool 100. In other embodiments, the capacitive sensor 500 may include circuitry to only output a signal to the controller 212 when the magnitude of the signal (i.e., the amount of movement of the power tool 100) exceeds a predetermined value or threshold for initiating a wake-up operation. As will be described in more detail below, the controller 212 may initiate a wake-up operation based on the output of the capacitive sensor 500.

Figure 6A:
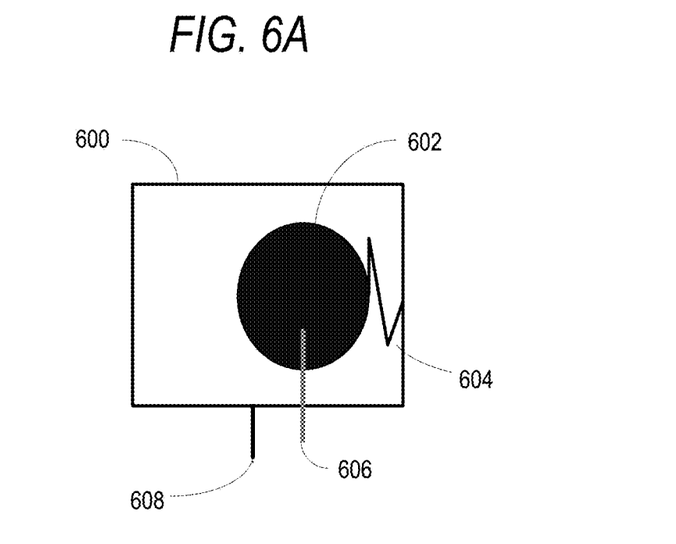
FIGS. 6A-6B are circuit diagrams illustrating a mechanical wake-up sensor, according to some embodiments.
Figure 6B:
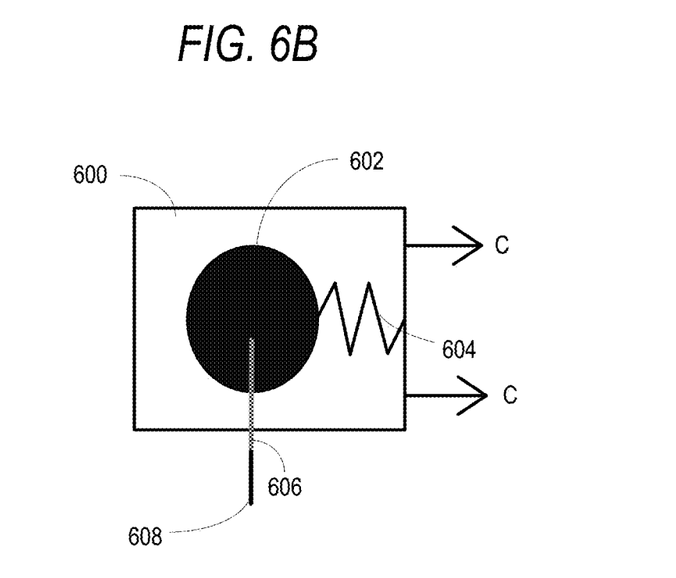

Turning now to FIG. 6A-6B, a mechanical sensor 600 (e.g., a mechanical motion sensor, a mechanical accelerometer, etc.) is shown, according to some embodiments. In some embodiments, the mechanical sensor 600 is used to determine when a wake-up operation is required, as described in more detail below. The mechanical sensor 600 includes a spring-biased mass 602, wherein a spring 604 coupled to the spring-biased mass 602 is oriented in a plane parallel to the desired direction (e.g., direction of motion to be detected) of motion of the power tool 100. Thus, in some examples, multiple mechanical sensors 600 may be used to detect motion on one or more of an x-axis, a y-axis, and a z-axis of the power tool 100. The mass 602 may further be connected to a first conductive plate 606 or other conductive member. The mechanical sensor 600 is configured such that as the power tool 100 moves in a direction C parallel to the spring 604, the mass 602 moves the first conductive plate 606, which in turn causes the conductive plate to contact a second conductive plate 608 as shown in FIG. 6B, thereby generating an output indicating movement of the power tool 100. For example, a voltage may be present on the first conductive plate 606 which may be transferred to the controller 212 via the second conductive plate 608. In other examples, contact between the first conductive plate 606 and second conductive plate 608 may complete a circuit generating a voltage or current value which may be input to the controller 212. In contrast to the piezoelectric sensor 400 and/or the capacitive sensor 500, the output of the mechanical sensor 600 is binary (e.g., output is either ON or OFF).

The above examples of sensors are exemplary in nature and are not intended to be limiting. Other sensor types, such as electromechanical servo accelerometers, magnetic induction accelerometers, null-balance accelerometers, optical accelerometers, pendulous integrating gyroscopic accelerometers, resonance accelerometers, surface micromachined capacitive ("MEMS") accelerometers, triaxial accelerometers, and/or other accelerometers are also contemplated, as appropriate for a given application. Additionally, other sensors, such as wake-up sensor 218 may also be used in lieu of, or in conjunction with, the accelerometers 216, to indicate that a wake-up operation is required. Wake-up sensor 218 types may include pressure-based sensors, mechanical-based sensors, capacitive sensors, inductive sensors, other sensors as applicable to indicate a manipulation of the power tool 100 by a user. For example, in one embodiment, the wake-up sensor 218 is an infrared or ultrasonic sensor configured to determine that a user's hand has covered the wake-up sensor 218 indicating that the power tool 100 has been picked up or is otherwise being handled or manipulated. In other examples, the wake-up sensor 218 may be a pressure sensor configured to generate an output to the controller 212 based on detecting a pressure provided by a user on the power tool 100. For example, the wake-up sensor 218 may be located in a handle or other portion of the power tool 100 configured to be gripped by a user. The output of the wake-up sensor 218, as described below, is configured to initiate a wake-up operation of the power tool 100.

Figure 7:
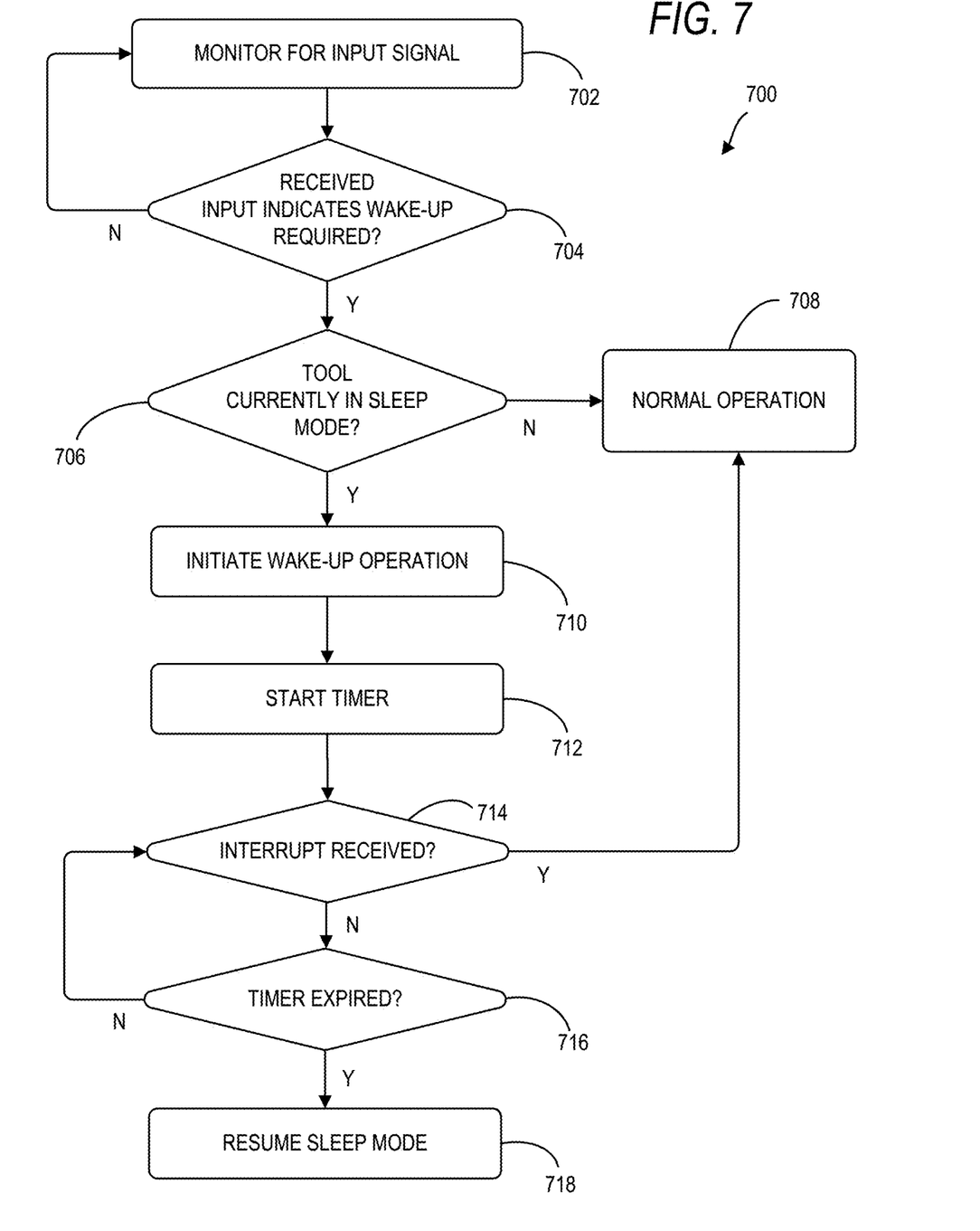
FIG. 7 is a flow chart illustrating a process for initiating a wake-up operation, according to some embodiments.

Turning to FIG. 7, a flowchart illustrating a process 700 for performing a wake-up operation in the power tool 100 is described, according to some embodiments. In one embodiment, the process 700 is performed by the controller 212. At process block 702 the controller 212 monitors for an input signal from one or more sensors, such as accelerometer 216 and/or the wake-up sensor(s) 218. In some examples, the controller 212 may be in a reduced power or standby operation (e.g., sleeping) such that only minimal operations are performed, such as monitoring for a user input either via the trigger 214 and/or the wake-up sensors 218. At process block 704, the controller 212 determines whether an input has been received that indicates that a wake-up operation is required from the accelerometers 216 and/or wake-up sensors 218. In some examples, the accelerometers 216 and/or wake-up sensors 218 may be configured to send signals to the controller 212 only when the value exceeds a predetermined threshold indicating sufficient movement. In other examples, the controller 212 may receive the direct input from the accelerometer 216 and/or wake-up sensors 218 and determine whether the magnitude of the signal indicates that a wake-up operation is required. For example, the controller 212 may compare the data received from the accelerometers 216 and/or wake-up sensors 218 against a predetermined threshold value.

In response to the controller 212 not receiving an input indicating that a wake-up operation is required at process block 704, the controller 212 continues monitoring for an input signal from the accelerometers 216 and/or wake-up sensors 218 at process block 702. In response to the controller 212 determining that an input has been received from the accelerometers 216 and/or the wake-up sensors 218 that indicates that a wake-up operation is required, the controller 212 determines whether the power tool 100 is currently in a standby or sleep mode at process block 706. In response to the controller 212 determining that the power tool 100 is not in the standby or sleep mode at process block 706, the controller 212 operates the power tool 100 in a normal operation mode. In response to the controller 212 determining that the power tool 100 is currently in the standby or sleep mode at process block 706, the controller 212 initiates a wake-up operation at process block 710. The wake-up operation may include various functions, such as preparing the motor 206 to operate immediately or substantially immediately (e.g., within one millisecond, within two milliseconds, within five milliseconds, within 10 milliseconds, within 20 milliseconds, within 30 milliseconds, within 50 milliseconds, or other similar time frames) upon receiving an input via the trigger 214, powering-on the user interface and providing data to the user via the user interface, activating all circuits and programs associated with normal operation of the power tool, or other operations as required for a given application. In one example, the controller 212 may initialize the power supply 202 and/or the motor drive circuit 204 such that there is no delay between the user actuating the trigger and motor rotation occurring. Initializing the power supply 202 may include closing one or more power main switches within the power supply to supply power to the motor drive circuit 204.

After initiating the wake-up operation at process block 710, the controller 212 starts a timer at process block 712. The timer may have a predefined value, such as 30 seconds. However, values of more than 30 seconds or less than 30 seconds are also contemplated as required for a given application. At process block 714, the controller 212 determines whether an interrupt has been received. An interrupt may be an input from the trigger 214, such as a trigger actuation. The interrupt may also be a signal received via the user interface 220, such as a mode selection or other user input. Upon the interrupt being received, the power tool 100 begins normal operation at process block 708.

In response to the interrupt not being received, the controller 212 determines whether the timer has expired at process block 716. In response to the timer not being expired, the controller continues to determine whether an interrupt has been received at process block 714. In response to determining that the timer has expired, the controller 212 resumes the standby and/or sleep mode at process block 718 to conserve energy. This can prevent incidental movement, such as a user simply putting the power tool away, from keeping the power tool in an operation condition (e.g., a wake-up mode).

Thus, embodiments described herein provide, among other things, a wake-up sensor for a power tool. Various features and advantages are set forth in the following claims.

What is claimed is:

1. A power tool comprising:
   a housing;
   a sensor;
   a motor drive circuit connected to a motor; and
   a motor controller connected to the motor drive circuit, the motor controller configured to:
      detect an input received from the sensor,
      determine whether the detected input exceeds a predetermined value,
      determine whether the power tool is in a sleep condition, and
      initiate a wake-up operation in response to determining that the detected input exceeds the predetermined value and determining that the power tool is in the sleep condition.

2. The power tool of claim 1, wherein the motor controller is further configured to:
   start a timer upon initiating the wake-up operation;
   determine whether an interrupt signal is received at the motor controller;
   determine that the timer has expired; and
   resume the sleep condition in response to the timer having expired and no interrupt signal being received.

3. The power tool of claim 2, wherein the interrupt signal is an actuation of a trigger of the power tool.

4. The power tool of claim 1, wherein the sensor is at least one selected from a group consisting of: an accelerometer, a piezoelectric sensor, and a capacitive sensor.

5. The power tool of claim 1, wherein the wake-up operation is configured to prepare the motor to operate substantially immediately upon receiving a user input from a trigger of the power tool.

6. The power tool of claim 1, wherein the sensor is a pressure sensor configured to detect a user gripping the power tool.

7. The power tool of claim 1, wherein the sensor is an ultrasonic sensor configured to detect a presence of a user's hand on the power tool.

8. A method of initiating a wake-up operation in a power tool, the method comprising:
   detecting an input received from a sensor of the power tool, the input indicating the wake-up operation is required;
   determining whether the power tool is in a sleep condition; and
   initiating the wake-up operation in response to:
      determining that the input received from the sensor exceeds a predetermined value, and
      determining that the power tool is in the sleep condition.

9. The method of claim 8, further comprising:
   starting a timer upon initiating the wake-up operation;
   determining whether an interrupt signal is received;
   determining that the timer has expired; and
   resuming the sleep condition in response to the timer having expired and no interrupt signal being received.

10. The method of claim 9, wherein the interrupt signal is generated by a user input received at a user interface of the power tool.

11. The method of claim 8, wherein the wake-up operation initializes a motor of the power tool to operate substantially immediately upon receiving a user input from a trigger of the power tool.

12. The method of claim 8, wherein the sensor is at least one selected from a group consisting of: a capacitive sensor, a piezoelectric sensor, and an accelerometer.

13. The method of claim 8, wherein the sensor is a pressure sensor configured to detect a user gripping the power tool.

14. The method of claim 8, wherein the sensor is an ultrasonic sensor configured to detect a presence of a user's hand on the power tool.

15. A power tool comprising:
a user interface;
a sensor;
a motor drive circuit connected to a motor and configured to drive the motor in response to a drive signal received from the user interface; and
a motor controller connected to the motor drive circuit, the motor controller configured to:
receive an input from the sensor,
determine whether the input received from the sensor exceeds a predetermined value,
determine whether the power tool is in a sleep condition,
initiate a wake-up operation in response to determining that the input received from the sensor exceeds the predetermined value and that the power tool is in the sleep condition,
start a timer upon initiating the wake-up operation,
determine whether an interrupt signal is received,
determine that the timer has expired, and
resume the sleep condition in response to the timer expiring and no interrupt signal being received.

16. The power tool of claim 15, operate substantially immediately upon receiving a user input from a trigger of the power tool.

17. The power tool of claim 16, wherein the interrupt is a user input received from the user interface of the power tool.

18. The power tool of claim 15, wherein the sensor is a piezoelectric sensor.

19. The power tool of claim 15, wherein the sensor is a capacitive sensor.

20. The power tool of claim 15, wherein the sensor is a mechanical accelerometer.

* * * * *